United States Patent
Wen et al.

(10) Patent No.: US 11,904,242 B2
(45) Date of Patent: Feb. 20, 2024

(54) PATHFINDING METHOD, APPARATUS, AND DEVICE, AND RECORDING MEDIUM

(71) Applicant: SHANGHAI LILITH TECHNOLOGY CORPORATION, Shanghai (CN)

(72) Inventors: Zhiyi Wen, Shanghai (CN); Huan Jin, Shanghai (CN)

(73) Assignee: SHANGHAI LILITH TECHNOLOGY CORPORATION, Shanghai (CN)

( * ) Notice: Subject to any disclaimer, the term of this patent is extended or adjusted under 35 U.S.C. 154(b) by 22 days.

(21) Appl. No.: 17/763,823

(22) PCT Filed: Aug. 26, 2020

(86) PCT No.: PCT/CN2020/111292
§ 371 (c)(1),
(2) Date: Mar. 25, 2022

(87) PCT Pub. No.: WO2021/068665
PCT Pub. Date: Apr. 15, 2021

(65) Prior Publication Data
US 2022/0314119 A1 Oct. 6, 2022

(30) Foreign Application Priority Data
Oct. 8, 2019 (CN) .......................... 201910949892.2

(51) Int. Cl.
*A63F 13/56* (2014.01)
*A63F 13/52* (2014.01)
*A63F 13/5372* (2014.01)
*G06F 17/11* (2006.01)

(52) U.S. Cl.
CPC .............. *A63F 13/56* (2014.09); *A63F 13/52* (2014.09); *A63F 13/5372* (2014.09); *G06F 17/11* (2013.01)

(58) Field of Classification Search
CPC ...... A63F 13/52; A63F 13/56; A63F 13/5372; A63F 13/60; A63F 13/822; A63F 2300/209; A63F 2300/807
See application file for complete search history.

(56) References Cited

U.S. PATENT DOCUMENTS

| 6,166,718 | A  | * | 12/2000 | Takeda  | A63F 13/56 345/419 |
| 6,585,600 | B1 | * | 7/2003  | Nakagawa | A63F 13/56 463/43 |
| 8,425,317 | B2 | * | 4/2013  | Izumi    | A63F 13/5372 463/30 |

(Continued)

*Primary Examiner* — David L Lewis
*Assistant Examiner* — Matthew D Hoel
(74) *Attorney, Agent, or Firm* — Amster, Rothstein & Ebenstein LLP

(57) ABSTRACT

The present invention provides a pathfinding method, and the method includes: determining a starting point and a target point of a target object; determining a distance range between the starting point and the target point on a grid map; selecting a pathfinding strategy corresponding to the distance range according to the distance range, wherein different pathfinding strategies are adopted for different distance ranges. The present invention further relates to a pathfinding apparatus and device, and a recording medium.

12 Claims, 4 Drawing Sheets

(56) References Cited

U.S. PATENT DOCUMENTS

| | | | |
|---|---|---|---|
| 8,506,371 B2* | 8/2013 | Mimura | A63F 13/5372 |
| | | | 463/31 |
| 10,786,734 B2* | 9/2020 | Tahkokallio | A63F 13/5372 |
| 11,338,201 B2* | 5/2022 | Tahkokallio | A63F 13/52 |
| 11,376,497 B2* | 7/2022 | Wang | A63F 13/35 |
| 2011/0034245 A1* | 2/2011 | Mimura | A63F 13/52 |
| | | | 463/31 |
| 2012/0021826 A1* | 1/2012 | Izumi | A63F 13/56 |
| | | | 463/30 |
| 2020/0155930 A1* | 5/2020 | Wang | A63F 13/5378 |
| 2020/0261797 A1* | 8/2020 | Tahkokallio | A63F 13/533 |
| 2021/0008451 A1* | 1/2021 | Tahkokallio | A63F 13/69 |
| 2022/0032191 A1* | 2/2022 | Wei | A63F 13/533 |
| 2022/0296997 A1* | 9/2022 | Wang | A63F 13/56 |
| 2022/0314119 A1* | 10/2022 | Wen | G06F 17/11 |
| 2022/0362664 A1* | 11/2022 | Tahkokallio | A63F 13/822 |
| 2023/0013663 A1* | 1/2023 | Liu | A63F 13/837 |
| 2023/0052088 A1* | 2/2023 | Zhou | A63F 13/69 |

\* cited by examiner

PATHFINDING METHOD, APPARATUS, AND DEVICE, AND RECORDING MEDIUM

TECHNICAL FIELD

The present invention relates to a pathfinding method, apparatus, and device for a game server, and a recording medium.

BACKGROUND

In navigation of a game map, a Dijkstra algorithm or an A* algorithm is usually used to implement pathfinding. However, when the map is large, performance overhead is too large for a server when the Dijkstra algorithm is used in real-time to find a shortest path. In addition, there are usually very long mountains and rivers in the game map, and the long mountains and rivers cannot be crossed by using the A* pathfinding algorithm. Therefore, for convenience, information of paths between all navigation points is calculated in advance, that is, the A* algorithm is used to perform pathfinding for a nearest navigation point, and then a navigation point closest to a target point is reached according to the navigation point path information, and then pathfinding is performed from the navigation point closest to the target point to the target point. In this way, a player does not need to calculate a navigation path in real-time when navigating, and can directly find the pre-calculated path according to the starting point and an ending point.

If the information of paths between all navigation points is calculated and stored in advance according to the above method, assuming that there are 15,000 navigation points in the map, a required storage space is 15000*15000*8=1800000000, about 1.8 G (a storage size of a path between every two points is 8 bytes), it takes about 400 milliseconds for a point to reach all the paths, and it takes about 1.6 hours for all points to reach all the paths.

The storage space and generation time are proportional to the size of a game map. The storage space of the path information generated by the existing navigation method is too large, and the generation time is too long. Consequently, not only performance overhead for the server is too large, but also it is not conducive to scalability and daily maintenance of the project, and player experience is further affected.

SUMMARY

For the problem in the prior art, the present invention provides a pathfinding method, apparatus, and device, and a recording medium.

According to some aspects, a pathfinding method is provided, wherein the method comprises:

determining a starting point and a target point of a target object;

determining a distance range between the starting point and the target point on a grid map; and selecting a pathfinding strategy corresponding to the distance range according to the distance range, where different pathfinding strategies are adopted for different distance ranges.

According to some other aspects, the determining a distance range between the starting point and the target point on a grid map further comprises:

determining whether the distance range between the starting point and the target point is within a first threshold size range, and if yes, adopting a first pathfinding strategy, or if no, adopting a second pathfinding strategy.

According to some other aspects, the adopting a first pathfinding strategy further comprises: determining whether the distance range between the starting point and the target point is within a second threshold size range, and if yes, adopting a third pathfinding strategy, or if no, adopting the first pathfinding strategy.

According to some other aspects, the first threshold size range is a nine-screen range, and the second threshold is smaller than the first threshold.

According to some other aspects, the third pathfinding strategy comprises: directly calculating a path between the starting point and the target point by using an A* algorithm.

According to some other aspects, the first pathfinding strategy comprises:

determining a path from the starting point to a first map navigation point closest to the starting point;

determining a path between the first map navigation point and a second map navigation point closest to the target point; and determining a path from the second map navigation point to the target point.

According to some other aspects, the second pathfinding strategy comprises:

determining a path from the starting point to a first map navigation point closest to the starting point;

determining a path from the first map navigation point to a first jump navigation point;

determining a path from the first jump navigation point to a second jump navigation point;

determining a path from the second jump navigation point to a second map navigation point closest to the target point; and determining a path from the second map navigation point to the target point;

wherein the grid map is divided into a plurality of blocks according to a predetermined size, a plurality of jump navigation points are predetermined for each block, the first jump navigation point and the second jump navigation point are selected from the plurality of jump navigation points, the first jump navigation point and the second jump navigation point are jump navigation points that are respectively located in the same block as the starting point and the target point and that are respectively closest to the starting point and the target point.

According to some other aspects, a pathfinding apparatus is provided, wherein the apparatus comprises:

a determining module, configured to determine a starting point and a target point of a target object;

a judging module, configured to determine a distance range between the starting point and the target point on the grid map; and a pathfinding strategy selecting module, configured to select a pathfinding strategy corresponding to the distance range according to the distance range, wherein different pathfinding strategies are adopted for different distance ranges.

According to some other aspects, a pathfinding device is provided, wherein the device comprises:

a memory, wherein the memory stores a computer executable instruction;

a processor, wherein the processor executes the computer-executable instruction to implement a pathfinding method, wherein the pathfinding method comprises:

determining a starting point and a target point of a target object;

determining a distance range between the starting point and the target point on a grid map; and selecting a pathfinding strategy corresponding to the distance range according to the distance range, wherein different pathfinding strategies are adopted for different distance ranges.

According to some other aspects, a computer-readable medium is provided, wherein the readable medium stores an instruction, and the instruction is executed to implement a pathfinding method, wherein the pathfinding method comprises:

determining a starting point and a target point of a target object;

determining a distance range between the starting point and the target point on a grid map; and selecting a pathfinding strategy corresponding to the distance range according to the distance range, wherein different pathfinding strategies are adopted for different distance ranges.

According to the pathfinding method of the present invention, different pathfinding strategies are selected according to the distance from the starting point to the target point. For example, an A* pathfinding algorithm can be directly used in a short distance. The A* pathfinding algorithm can be used in the nine-screen range to perform pathfinding to a starting navigation point, then to an ending navigation point, and a target point is finally reached. For longer-distance path navigation, pathfinding can be performed by using jump navigation points.

According to the pathfinding method of the present invention, a size of a base file for recording the navigation point path information can be reduced to less than 100M, and the file generation time is also shortened to be within a few minutes. Therefore, scalability of an entire game project is greatly improved and costs of maintenance and development are reduced.

DETAILED DESCRIPTION

In order to make objectives and technical solutions of the embodiments of the present invention clearer, the technical solutions of the embodiments of the present invention are described clearly and completely with reference to the accompanying drawings of the embodiments of the present invention. Obviously, the described embodiments are a part of the embodiments of the present invention, rather than all of the embodiments. Based on the described embodiments of the present invention, all other embodiments obtained by a person of ordinary skill in the art without creative efforts shall fall within the protection scope of the present invention.

According to the embodiments of the present invention, an implementation of a data processing method is provided. It should be noted that the steps shown in the flowchart of the accompanying drawings can be performed in a computer system that can execute instructions. Although a logical sequence is shown in the flowchart, in some cases, the shown or described steps may be performed in a sequence different from the sequence herein.

Figure 1:
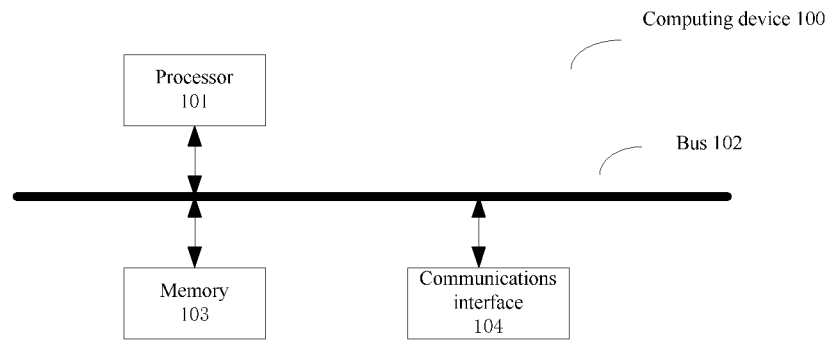
FIG. 1 is a schematic structural diagram of a computing device for a pathfinding method according to an embodiment of the present invention.

The method implementation provided in the implementations of the present application can be performed in a computing device. FIG. 1 is a schematic structural diagram of a computing device for a pathfinding method according to an implementation of the present invention. As shown in FIG. 1, the computing device 100 may include one or more (only one is shown in the figure) processors 101 (the processor 101 may include, but is not limited to, a central processing unit CPU, a graphics processing unit GPU, a digital signal processor DSP, a microprocessor MCU, or a processing device such as a field-programmable gate array FPGA), a bus 102, a memory 103 for storing data, and a communications interface 104 for communication functions. A person of ordinary skill in the art can understand that the structure shown in FIG. 1 is only for illustration, and does not limit the structure of the above electronic device. For example, the computing device 100 may further include more or fewer components than that shown in FIG. 1, or have a different configuration from that shown in FIG. 1.

The memory 103 can be used to store software programs and modules of databases, queues, and application software, such as program instructions/modules corresponding to the pathfinding method in the embodiment of the present invention. The processor 101 runs the software programs and modules stored in the memory 103, to execute various functional applications and data processing, that is, to implement the pathfinding method. The memory 103 may include a high-speed random-access memory, and may include a non-volatile memory, such as one or more magnetic storage devices, a flash memory, or another non-volatile solid-state memory. In some examples, the memory 103 may further include memories remotely provided relative to the processors 101, and these remote memories may be connected to the computing device 100 through a network. An example of the network includes, but is not limited to, Internet, an intranet, a local area network, a mobile communication network, and a combination thereof.

The communications interface 104 is used to receive or send data through a network, and the network may include various connection types, such as wired/wireless communication links, or fiber optic cables. The specific example of the network may include Internet provided by a communication provider of the computing device 100.

Figure 2:
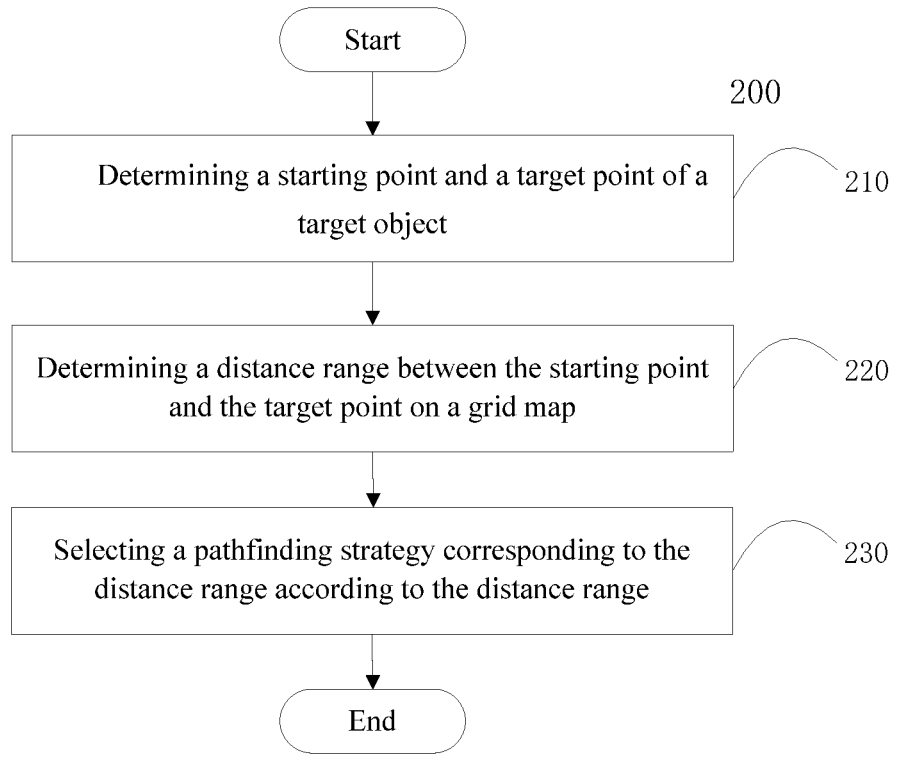
FIG. 2 is a flowchart of a pathfinding method according to an embodiment of the present invention.

In the above operating environment, the present invention provides a pathfinding method as shown in FIG. 2. The method can be applied to the computing device and performed by the processor in the computing device. At least one application program is installed in the computing device. The type of the application program is not limited in the embodiments of the present invention, and may be a system application program or a software application program.

FIG. 2 is a flowchart of a pathfinding method 200 according to an embodiment of the present invention. As shown in FIG. 2, the method flow is as follows:

Firstly, step 210: determine a starting point and a target point of a target object; then, step 220: determine a distance range between the starting point and the target point on a grid map; finally, step 230: select a pathfinding strategy corresponding to the distance range according to the distance range.

According to the pathfinding method of the present invention, different pathfinding strategies are selected according to the distance from the starting point to the target point, instead of blindly using a Dijkstra algorithm or an A* algorithm to implement pathfinding, so that a size of a navigation point path information base file is reduced, and file generation time is shortened.

Each method implementation of the present invention can be implemented in software, magnetic members, firmware, and the like. Regardless of whether the present invention is implemented in software, magnetic members, or firmware, an instruction code can be stored in any type of computer-accessible memory (for example, permanent or modifiable, volatile or non-volatile, solid or non-solid, fixed or replaceable media, etc.). Similarly, the memory may be, for example, programmable array logic ("PAL"), a random-access memory ("RAM"), a programmable read-only memory ("PROM"), a read-only memory ("ROM"), an electrically erasable programmable read-only memory ("EEPROM"), a magnetic disk, an optical disc, and a digital versatile disc ("DVD").

Figure 3:
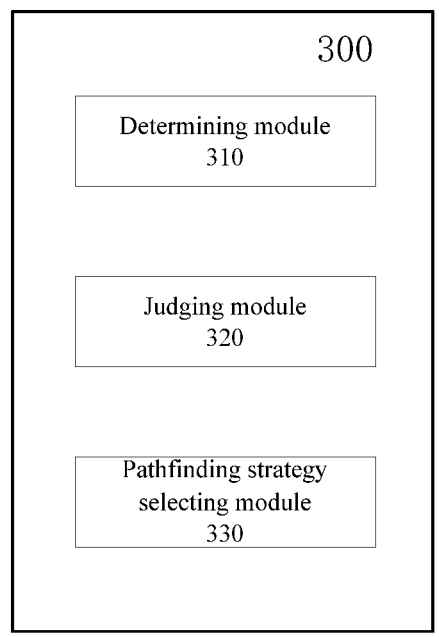
FIG. 3 is a schematic block diagram of a pathfinding apparatus according to an embodiment of the present invention.

FIG. 3 is a schematic block diagram of a pathfinding apparatus 300 according to an embodiment of the present invention. The device is used to perform the above method flow, including:

a determining module 310, configured to determine a starting point and a target point of a target object;

a judging module 320, configured to determine a distance range between the starting point and the target point on a grid map;

a pathfinding strategy selecting module 330, configured to select a pathfinding strategy corresponding to the distance range according to the distance range, where different pathfinding strategies are adopted for different distance ranges.

Further, it is determined whether the distance range between the starting point and the target point is within a first threshold size range, and if yes, a first pathfinding strategy is adopted, or if no, a second pathfinding strategy is adopted.

Further, it is determined whether the distance range between the starting point and the target point is within a second threshold size range, and if yes, a third pathfinding strategy is adopted, or if no, the first pathfinding strategy is adopted.

Further, the first threshold size range is a nine-screen range, and the second threshold is smaller than the first threshold.

Further, the third pathfinding strategy includes directly calculating a path between the starting point and the target point by using an A* algorithm.

Further, the first pathfinding strategy includes:
determining a path from the starting point to a first map navigation point closest to the starting point;
determining a path between the first map navigation point and a second map navigation point closest to the target point; and
determining a path from the second map navigation point to the target point.

Further, the second pathfinding strategy includes:
determining a path from the starting point to a first map navigation point closest to the starting point;
determining a path from the first map navigation point to a first jump navigation point;
determining a path from the first jump navigation point to a second jump navigation point;
determining a path from the second jump navigation point to a second map navigation point closest to the target point; and
determining a path from the second map navigation point to the target point.

The grid map is divided into a plurality of blocks according to a fixed size, a plurality of jump navigation points are predetermined for each block, the first jump navigation point and the second jump navigation point are selected from the plurality of jump navigation points, the first jump navigation point and the second jump navigation point are navigation points that are respectively located in the same block as the starting point and the target point and that are respectively closest to the starting point and the target point.

It should be noted that, the pathfinding apparatus 300 can be configured to perform corresponding operations, actions, and processes in the method 200. In addition, there may be a correspondence between the various modules of the apparatus 300 and the various modules shown in FIG. 2. Descriptions of these operations, actions, and processes are omitted herein.

According to another embodiment of the present invention, a pathfinding device is further provided. The pathfinding device includes a memory, wherein the memory stores a computer-executable instruction; and a processor, wherein the processor executes the computer-executable instruction to implement the pathfinding method. The pathfinding method comprises:

determining a starting point and a target point of a target object;

determining a distance range between the starting point and the target point on a grid map; and selecting a pathfinding strategy corresponding to the distance range according to the distance range, where different pathfinding strategies are adopted for different distance ranges.

Figure 4:
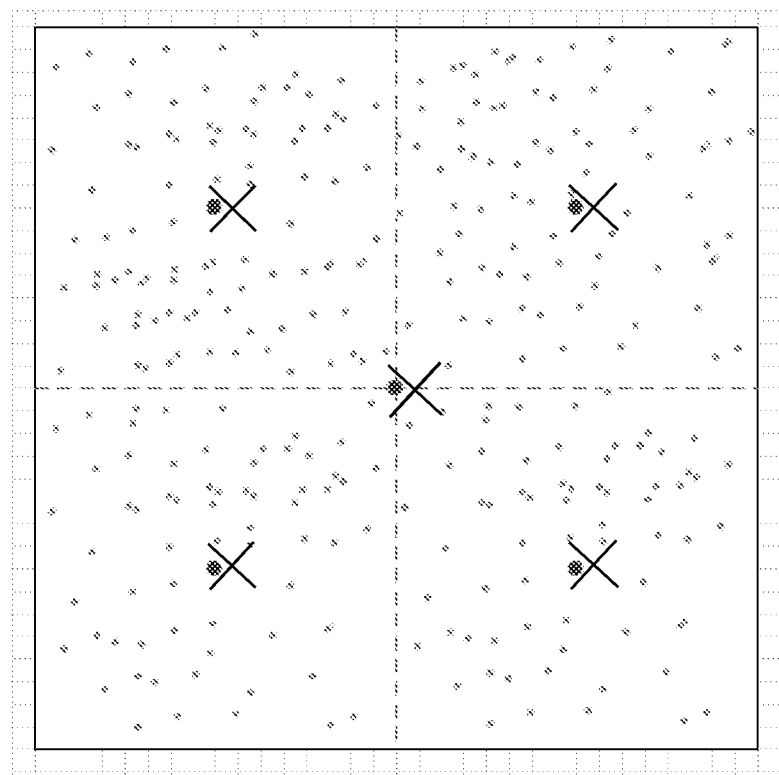
FIG. 4 is a schematic diagram of map navigation points and jump navigation points within a split screen range according to a specific embodiment of the present invention.
Figure 5:
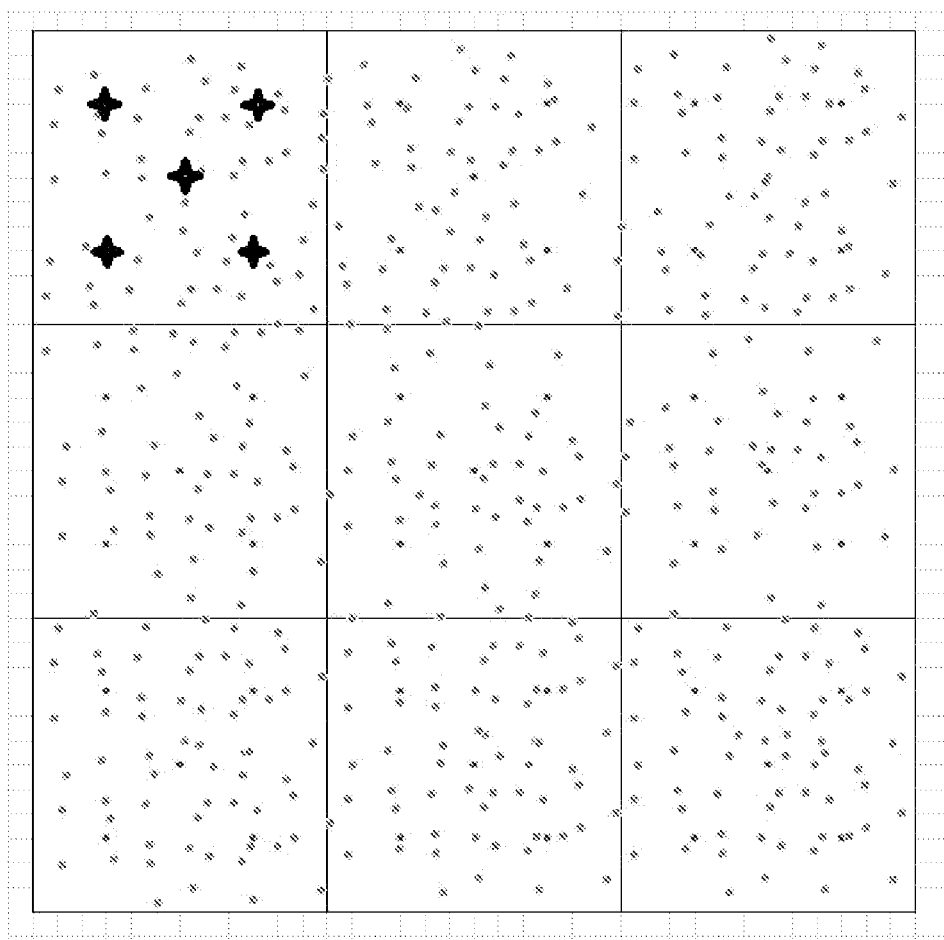
FIG. 5 is a schematic diagram of map navigation points and jump navigation points within a nine-screen range according to a specific embodiment of the present invention.
Figure 6:
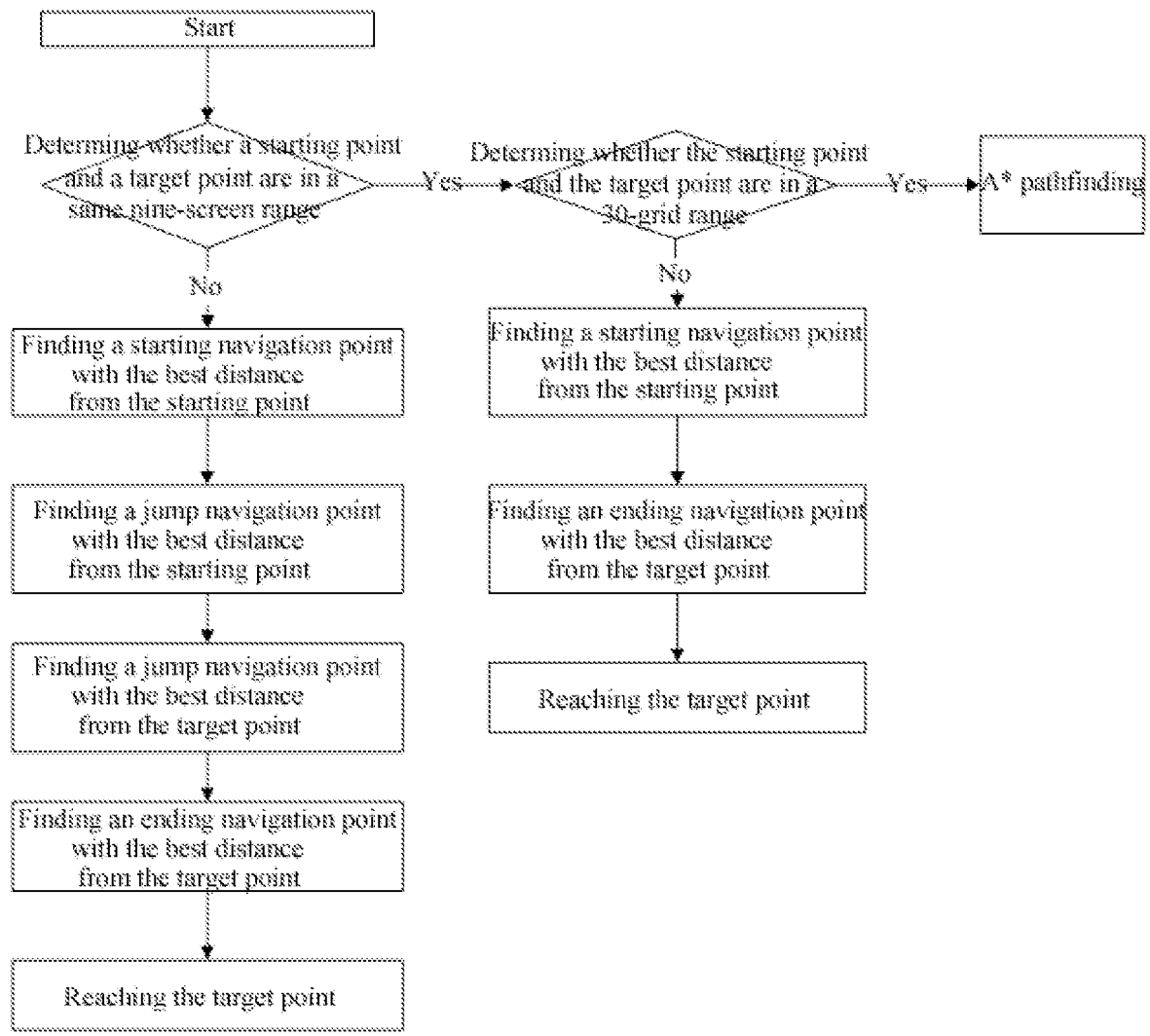
FIG. 6 is a flowchart of a pathfinding method according to a specific embodiment of the present invention.

Next, with reference to FIGS. 4-6, a pathfinding method according to the present invention is described by using a specific example. Assuming that a size of a map used by a game is about 1800*2100 grids, and there are 15,000 map navigation points generated by an engine, and these 15,000 navigation points can also be called first-level navigation points.

Firstly, second-level navigation points for jumping are generated based on information of the 15,000 first-level navigation points on the map, and can also be called jump navigation points. An actual geographical location is used as an example, Caohejing, Nanjing Road, Bund, Xujiahui, etc. can be regarded as first-level navigation points, while Shanghai Municipality, an upper-level administrative division, can be regarded as a second-level navigation point.

Then, the game map is divided into a plurality of blocks according to a 100*100 grid range, and the block of a 100*100 size is divided into quarters, and then information of navigation points respectively closest to center points of each quarter and a center point of the entire block is calculated, and the above calculated navigation points are set as second-level navigation points, such as five larger points marked by "x" in FIG. 4. In this embodiment, five points in each block are found as second-level navigation points.

FIG. 5 is a schematic diagram of map navigation points within a nine-screen size, that is, a map of a 300*300 size is formed by 9 blocks of a 100*100 size, and five second-level navigation points in the upper left corner are marked with a star. As shown in FIG. 5, information of all the navigation points in each block and information of all the navigation points in other surrounding blocks within the nine-screen range, form a new path graph, information of paths from each navigation point to all other navigation points is calculated, and the navigation point path information is stored in a first-level navigation path base file. That is, for all the first-level navigation points, only the first-level navigation point path information in a nine-screen range needs to be stored. For information of a further path between the starting point and the target point that exceeds the nine-screen range, jumping can be performed by using the second-level navigation points information.

Then, a full connectivity map is formed according to the generated information of all second-level navigation points, and the information of paths from all second-level navigation points to all other second-level navigation points is calculated and stored in the second-level navigation path base file.

By using the method of the present invention, there are about 40 navigation points in each block with 100×100 size, and there are about 360 points in a nine-screen range of each point. Therefore, a storage information size of the first-level navigation points is about 15000*360*8=43200000, which is about 43M. The number of second-level navigation points is 18*21*5=1890, and therefore a storage information size of the second-level navigation points is about 1890*1890*8=28576800, which is about 28M. Compared with the original pathfinding method, a size of the path information base file is greatly reduced, and generation time can also be reduced to 3 to 5 minutes.

FIG. 6 is a flowchart of a pathfinding method according to a specific example of the present invention.

As shown in FIG. 6, when a player character performs pathfinding navigation, a distance range between a starting point and a target point needs to be determined. If it is determined that the starting point and the target point are within a same nine-screen range, a navigation point pathfinding strategy is adopted to perform pathfinding by using a first-level map navigation point. Firstly, an initial first-level navigation point with the best distance from the starting point is found. Then, an ending first-level navigation point with the best distance to the target point is found. Finally, the target point is reached from the ending navigation point.

Further, considering advantages and convenience of A* pathfinding algorithm, when the starting point and the target point are in the same nine-screen range, it can be further determined whether the distance between the starting point and the target point is within a smaller threshold range. The person skilled in the art can understand that the larger the distance range, the greater the pressure on A* pathfinding algorithm performance of a server, and if the distance range is too small, a blind spot for pathfinding is also caused. With reference to the current map structure, the inventor finds that a 30-grid range is a relatively reasonable value. Therefore, in this example, if it is further determined that the distance between the starting point and the target point is within the 30-grid range, the pathfinding strategy for real-time paths can be directly calculated by using the A* pathfinding algorithm.

When the starting point and the target point are not in the same nine-screen range, another pathfinding strategy is adopted, and pathfinding is performed by using second-level navigation points for jumping. Firstly, a first-level navigation point with the best distance from the starting point is found. Secondly, a second-level navigation point with the best distance from the start point is found for jumping. Then, a jump navigation point and an ending navigation point with the best distance to the target point are found. Finally, the target point is reached.

A pathfinding algorithm known to the person skilled in the art such as a Dijkstra algorithm in the prior art can be used for a path from the starting point to the starting navigation point and a path from the ending navigation point to the target point. In the method of the present invention, a size of the path information base file can be greatly reduced, and therefore other path such as a path between the first-level navigation point and the second-level navigation point can be calculated and stored in advance, and can be obtained more easily and quickly.

According to the method of the present invention, different pathfinding strategies are adopted for different distance ranges between starting points and target points. For games with larger maps, a size of a navigation point path information base file can be greatly reduced, and file generation time can be shortened, and scalability of the project is improved and cost of project maintenance and development are reduced.

The above description of the size of the map block, the selection of second-level navigation points, the distance range between the starting point and the target point, and the corresponding pathfinding strategy are only for the purpose of facilitating understanding. The person skilled in the art can understand that adjustments can be made according to actual conditions and requirements.

For example, for determining of the distance range between the starting point and the target point, whether the distance range exceeds a 30-grid range can be determined first, and if the 30-grid range is exceeded, whether the distance range exceeds a nine-screen range can be determined.

For another example, when the size of the map is larger, larger map blocks can be obtained by division. Assuming that the map is expanded 3 times both horizontally and vertically, the number of first-level navigation points is increased by 9 times, a storage size of first-level navigation points is increased by 9 times, and a storage size of second-level navigation points is increased by 81 times. In the selection of the character pathfinding strategy, a three-level navigation point for jumping is further used. The calculation method of the first-level and second-level navigation points mentioned above are kept unchanged, the map blocks are obtained by division according to the size of 300*300, the third-level navigation points are further calculated, the final number of third-level navigation points is about 1890, and a storage information size of the third-level navigation points is about 28M. The number of second-level navigation points is about 1890*9, which is about 17000, there are 45 second-level navigation points in the large screen of 300*300, a storage size of second-level navigation points is 17000*45*9*8, which is about 62M.

A lot of specific details are explained in the description provided herein. However, it can be understood that the embodiments of the present invention can be practiced without these specific details. In some examples, wellknown methods, structures, and technologies are not shown in detail, so as not to obscure the understanding of the description.

Similarly, it should be understood that in order to simplify the present invention and help understand one or more of the various aspects of the invention, in the above description of the exemplary embodiments of the present invention, various features of the present invention are sometimes grouped together into a single embodiment, figure, or a description thereof. However, the disclosed method should not be interpreted as reflecting the intention that the protected invention requires more features than those explicitly stated in the claims. More precisely, as reflected in the claims, the features of the inventive aspect are less than all the features of a single embodiment disclosed previously. Therefore, the claims following a specific embodiment are thus explicitly incorporated into the specific embodiment, and each claim serves as a separate embodiment of the present invention.

The person skilled in the art can understand that the modules in the device in the embodiment can be adaptively changed and disposed in one or more devices different from that in the embodiment. The modules or units or components in the embodiment can be combined into one module or unit or component, and in addition, can be divided into a plurality of sub-modules or sub-units or sub-components. Except that at least some of such features and/or processes or units are mutually exclusive, any combination can be used to combine all features disclosed in the description (including the accompanying claims, abstract and drawings) and all processes or units of any method or device disclosed in this manner. Unless expressly stated otherwise, each feature disclosed in this description (including the accompanying claims, abstract and drawings) may be replaced by an alternative feature providing the same, equivalent or similar purpose.

In addition, the person skilled in the art can understand that, although some embodiments described herein include some but not other features included in other embodiments, combinations of features of different embodiments are meant to be within the scope of the claims, and form different embodiments. For example, in the claims, any one of the protected embodiments can be used in any combination.

The word "comprising" does not exclude the presence of elements or steps not listed in the claims. The word "a" or "an" preceding an element does not exclude the presence of multiple such elements. The present invention can be implemented by means of hardware comprising several different elements and by means of suitably programmed terminal devices. In the unit claims listing several terminal devices, several of these terminal devices may be embodied in the same hardware item. The use of the words "first", "second", and "third", etc. do not indicate any order. These words can be interpreted as names.

The invention claimed is:

1. A pathfinding method, wherein the method comprises:
determining a starting point and a target point of a target object;
determining a distance range between the starting point and the target point on a grid map; and
selecting a pathfinding strategy corresponding to the distance range according to the distance range, wherein different pathfinding strategies are adopted for different distance ranges,
wherein the determining a distance range between the starting point and the target point on a grid map further comprises:
determining whether the distance range between the starting point and the target point is within a first threshold size range, and if yes, adopting a first pathfinding strategy, or if no, adopting a second pathfinding strategy,
wherein the first pathfinding strategy comprises:
determining a path from the starting point to a first map navigation point closest to the starting point;
determining a path between the first map navigation point and a second map navigation point closest to the target point; and
determining a path from the second map navigation point to the target point,
wherein the second pathfinding strategy comprises:
determining a path from the starting point to a first map navigation point closest to the starting point;
determining a path from the first map navigation point to a first jump navigation point;
determining a path from the first jump navigation point to a second jump navigation point;
determining a path from the second jump navigation point to a second map navigation point closest to the target point; and
determining a path from the second map navigation point to the target point;
wherein the grid map is divided into a plurality of blocks according to a predetermined size, a plurality of jump navigation points are predetermined for each block, the first jump navigation point and the second jump navigation point are selected from the plurality of jump navigation points, the first jump navigation point and the second jump navigation point are jump navigation points that are respectively located in the same block as the starting point and the target point and that are respectively closest to the starting point and the target point.

2. The method according to claim 1, wherein the adopting a first pathfinding strategy further comprises:
determining whether the distance range between the starting point and the target point is within a second threshold size range, and if yes, adopting a third pathfinding strategy, or if no, adopting the first pathfinding strategy.

3. The method according to claim 2, wherein the first threshold size range is a nine-screen range, and the second threshold size range is smaller than the first threshold size range.

4. The method according to claim 3, wherein the third pathfinding strategy comprises:
directly calculating a path between the starting point and the target point by using an A* algorithm.

5. A pathfinding apparatus, wherein the apparatus comprises:
a determining module, configured to determine a starting point and a target point of a target object;
a judging module, configured to determine a distance range between the starting point and the target point on a grid map; and
a pathfinding strategy selecting module, configured to select a pathfinding strategy corresponding to the distance range according to the distance range, wherein different pathfinding strategies are adopted for different distance ranges,
wherein the determining a distance range between the starting point and the target point on a grid map further comprises:

determining whether the distance range between the starting point and the target point is within a first threshold size range, and if yes, adopting a first pathfinding strategy, or if no, adopting a second pathfinding strategy, wherein the first pathfinding strategy comprises:

determining a path from the starting point to a first map navigation point closest to the starting point;

determining a path between the first map navigation point and a second map navigation point closest to the target point; and determining a path from the second map navigation point to the target point, wherein the second pathfinding strategy comprises:

determining a path from the starting point to a first map navigation point closest to the starting point;

determining a path from the first map navigation point to a first jump navigation point;

determining a path from the first jump navigation point to a second jump navigation point;

determining a path from the second jump navigation point to a second map navigation point closest to the target point; and determining a path from the second map navigation point to the target point;

wherein the grid map is divided into a plurality of blocks according to a predetermined size, a plurality of jump navigation points are predetermined for each block, the first jump navigation point and the second jump navigation point are selected from the plurality of jump navigation points, the first jump navigation point and the second jump navigation point are jump navigation points that are respectively located in the same block as the starting point and the target point and that are respectively closest to the starting point and the target point.

6. A pathfinding device, wherein the device comprises:

a memory, wherein the memory stores a computer executable instruction;

a processor, wherein the processor executes the computer-executable instruction to implement a pathfinding method, wherein the pathfinding method comprises:

determining a starting point and a target point of a target object;

determining a distance range between the starting point and the target point on a grid map; and selecting a pathfinding strategy corresponding to the distance range according to the distance range, wherein different pathfinding strategies are adopted for different distance ranges, wherein the determining a distance range between the starting point and the target point on a grid map further comprises:

determining whether the distance range between the starting point and the target point is within a first threshold size range, and if yes, adopting a first pathfinding strategy, or if no, adopting a second pathfinding strategy, wherein the first pathfinding strategy comprises:

determining a path from the starting point to a first map navigation point closest to the starting point;

determining a path between the first map navigation point and a second map navigation point closest to the target point; and determining a path from the second map navigation point to the target point, wherein the second pathfinding strategy comprises:

determining a path from the starting point to a first map navigation point closest to the starting point;

determining a path from the first map navigation point to a first jump navigation point;

determining a path from the first jump navigation point to a second jump navigation point;

determining a path from the second jump navigation point to a second map navigation point closest to the target point; and determining a path from the second map navigation point to the target point;

wherein the grid map is divided into a plurality of blocks according to a predetermined size, a plurality of jump navigation points are predetermined for each block, the first jump navigation point and the second jump navigation point are selected from the plurality of jump navigation points, the first jump navigation point and the second jump navigation point are jump navigation points that are respectively located in the same block as the starting point and the target point and that are respectively closest to the starting point and the target point.

7. A computer-readable medium, wherein the readable medium stores an instruction, and the instruction is executed to implement a pathfinding method, wherein the pathfinding method comprises:

determining a starting point and a target point of a target object;

determining a distance range between the starting point and the target point on a grid map; and selecting a pathfinding strategy corresponding to the distance range according to the distance range, wherein different pathfinding strategies are adopted for different distance ranges, wherein the determining a distance range between the starting point and the target point on a grid map further comprises:

determining whether the distance range between the starting point and the target point is within a first threshold size range, and if yes, adopting a first pathfinding strategy, or if no, adopting a second pathfinding strategy, wherein the first pathfinding strategy comprises:

determining a path from the starting point to a first map navigation point closest to the starting point;

determining a path between the first map navigation point and a second map navigation point closest to the target point; and determining a path from the second map navigation point to the target point, wherein the second pathfinding strategy comprises:

determining a path from the starting point to a first map navigation point closest to the starting point;

determining a path from the first map navigation point to a first jump navigation point;

determining a path from the first jump navigation point to a second jump navigation point;

determining a path from the second jump navigation point to a second map navigation point closest to the target point; and determining a path from the second map navigation point to the target point;

wherein the grid map is divided into a plurality of blocks according to a predetermined size, a plurality of jump navigation points are predetermined for each block, the first jump navigation point and the second jump navigation point are selected from the plurality of jump navigation points, the first jump navigation point and the second jump navigation point are jump navigation points that are respectively located in the same block as the starting point and the target point and that are respectively closest to the starting point and the target point.

8. The device according to claim 7, wherein the grid map is divided into nine blocks to form a nine-screen range, and there are 40 map navigation points in each block.

9. The device according to claim 8, wherein there are 5 jump navigation points in each block.

10. A computer-readable medium, wherein the readable medium stores an instruction, and the instruction is executed to implement a pathfinding method, wherein the pathfinding method comprises:

determining a starting point and a target point of a target object;

determining a distance range between the starting point and the target point on a grid map; and selecting a pathfinding strategy corresponding to the distance range according to the distance range, wherein different pathfinding strategies are adopted for different distance ranges, wherein the determining a distance range between the starting point and the target point on a grid map further comprises:

determining whether the distance range between the starting point and the target point is within a first threshold size range, and if yes, adopting a first pathfinding strategy, or if no, adopting a second pathfinding strategy, wherein the first pathfinding strategy comprises:

determining a path from the starting point to a first map navigation point closest to the starting point;

determining a path between the first map navigation point and a second map navigation point closest to the target point; and determining a path from the second map navigation point to the target point, wherein the second pathfinding strategy comprises:

determining a path from the starting point to a first map navigation point closest to the starting point;

determining a path from the first map navigation point to a first jump navigation point;

determining a path from the first jump navigation point to a second jump navigation point;

determining a path from the second jump navigation point to a second map navigation point closest to the target point; and determining a path from the second map navigation point to the target point;

wherein the grid map is divided into a plurality of blocks according to a predetermined size, a plurality of jump navigation points are predetermined for each block, the first jump navigation point and the second jump navigation point are selected from the plurality of jump navigation points, the first jump navigation point and the second jump navigation point are jump navigation points that are respectively located in the same block as the starting point and the target point and that are respectively closest to the starting point and the target point.

11. The computer-readable medium according to claim 10, wherein the grid map is divided into nine blocks to form a nine-screen range, and there are 40 map navigation points in each block.

12. The computer-readable medium according to claim 11, wherein there are 5 jump navigation points in each block.

* * * * *